United States Patent [19]

Kasserra

[11] 4,080,421

[45] Mar. 21, 1978

[54] PROCESS FOR PREPARING AMMONIUM TUNGSTATES

[75] Inventor: Hans Peter Kasserra, Brockville, Canada

[73] Assignee: Du Pont of Canada Ltd., Montreal, Canada

[21] Appl. No.: 766,424

[22] Filed: Jan. 27, 1977

[30] Foreign Application Priority Data

Jan. 29, 1976  Canada .................................. 244545

[51] Int. Cl.$^2$ ........................................... C01G 41/00
[52] U.S. Cl. ....................................... 423/61; 423/53; 423/56; 423/606; 423/593; 75/103; 75/121; 75/97 R
[58] Field of Search ...................... 423/53, 56, 58, 61, 423/606, 593; 75/97 R, 101 R, 103, 121

[56] References Cited

U.S. PATENT DOCUMENTS

| 1,255,144 | 2/1918 | Ekeley et al. ........................... 423/58 |
| 1,388,857 | 8/1921 | Giles et al. .............................. 423/58 |
| 1,535,019 | 4/1925 | Dorsey .................................. 423/606 |
| 2,992,916 | 7/1961 | Newkirk ................................. 75/121 |
| 3,429,693 | 2/1969 | Bauer et al. ............................. 423/61 |

FOREIGN PATENT DOCUMENTS 494,947   10/1938   United Kingdom .................. 423/53

OTHER PUBLICATIONS

Vezina et al., "Transactions Conference of Metallurgists Ottawa," Aug. 1965, pp. 445–449.

*Primary Examiner*—Herbert T. Carter

[57] ABSTRACT

A process is provided for preparing ammonium tungstate. In the process, a reduced calcium tungstate is treated in the presence of an oxidizing agent with an aqueous solution having at least ammonium cations and carbonate and/or bicarbonate anions, at a temperature of 10° C to the boiling point of the solution. The reduced calcium tungstate reacts with the ammonium cations to form the ammonium tungstate which is soluble in the solution and with the anions to form a calcium compound which is insoluble in the solution. Oxygen and/or hydrogen peroxide are preferred oxidizing agents. The process is especially useful in separating tungsten values from scheelite ores or concentrates.

8 Claims, No Drawings

PROCESS FOR PREPARING AMMONIUM TUNGSTATES

BACKGROUND OF THE INVENTION

1. Field of the Invention

This invention relates to a process for preparing ammonium tungstate. More particularly, the invention concerns a process for preparing ammonium tungstate from calcium tungstate ores or concentrates that have been subjected to a reduction step.

2. Prior Art

Various tungsten compositions are known in the art. Calcium forms a tungstate mineral known as scheelite ($CaWO_4$). Calcium also forms a tricalcium tungstate of the formula $Ca_3WO_6$. Iron and manganese form a range of tungstate minerals varying in composition between $FeWO_4$ and $MnWO_4$. These minerals are generally referred to as ferberite, wolframite and huebnerite, depending on the composition of the mineral. Generally, ferberite is used to describe such a mineral containing more than 20% by weight of FeO and huebnerite, when the mineral contains more than 20% by weight of MnO. The intermediate compositions are referred to as wolframite, although this term is often used for the whole range of compositions; such use may be made hereinafter. These various minerals and tungsten compositions are important sources of tungsten trioxide and metallic tungsten.

In conventional processes for recovering tungsten values from scheelite or from wolframite ores, the ores are usually concentrated by gravity, magnetic and/or flotation techniques. The concentrates, so formed, are then processed further. For example, water soluble sodium tungstate can be obtained by fusing a concentrate with sodium carbonate or by contacting a concentrate with hot sodium hydroxide solution. Acidification of the aqueous sodium tungstate solution yields insoluble tungstic acid. Alternatively, tungstic acid can be obtained from the concentrate by leaching the concentrate with a strong acid, such as concentrated hydrochloric acid. The tungstic acid can then be dissolved in a base and processed further to recover other tungsten values.

Frequently ammonium tungstate is formed in known processes as an intermediate, which is then isolated, dried and heated to form tungsten trioxide. The ammonium tungstate is believed to be the paratungstate salt, which may be defined as having the formula $x(NH_4)_2O \cdot yWO_3 \cdot zH_2O$ with, for example, $x=3$ and $y=7$ or $x=5$ and $y=12$, the value of $z$ depending on the conditions of crystallization of the salt. This intermediate can be formed by dissolving tungstic acid in ammonium hydroxide, and subsequently can be converted to tungsten trioxide, tungsten and other useful tungsten compounds by techniques such as those described in K. C. Li and C. Y. Wang, "Tungsten," American Chemical Society Monograph 130, Reinhold Publishing Corporation, New York (1955), especially Chapter IV.

Each of the above-described processes is useful for extracting tungsten values from various tungsten compositions. However, lower levels of impurities in products produced with good yields are technically and economically desirable. For example, ammonium tungstate manufactured by known processes is susceptible to contamination by impurities. The concentration of such impurities depends at least in part on the actual process conditions employed in the manufacture of the ammonium tungstate and on the composition of the tungsten ore.

SUMMARY OF THE INVENTION

According to the present invention, a process is provided for preparing ammonium tungstate comprising treating a reduced calcium tungstate with an aqueous solution having at least ammonium cations and anions selected from the group consisting of carbonate ions, bicarbonate ions and mixtures thereof, at a temperature in the range of 10° C to the boiling point of the solution in the presence of an oxidizing agent, the reduced calcium tungstate reacting with the cations to form the ammonium tungstate which is soluble in the solution and with the anions to form a calcium compound which is insoluble in the solution. Preferred oxidizing agents include oxygen and/or hydrogen peroxide. During the aqueous treatment, it is frequently advantageous to bubble ammonia through the aqueous solution. The bubbling of carbon dioxide through the solution can also be advantageous. The preferred temperature range is from 30° to 70° C.

The reduced calcium tungstate that is treated with the aqueous solution generally comprises reduction products which include tricalcium tungstate and/or metallic tungsten, preferably in finely divided form. The reduced calcium tungstate can be prepared by heating a material containing calcium tungstate, such as ore or concentrate of scheelite, at a temperature of 800° to 1300° C, preferably 1050° to 1250° C, in the presence of a reducing agent, preferably hydrogen.

The aqueous treatment step can be followed by (a) separation of the thusly formed solution of ammonium tungstate, (b) isolation of the ammonium tungstate in a solid form and (c) conversion of the ammonium tungstate to tungsten trioxide.

DETAILED DESCRIPTION OF THE INVENTION

In the process of the present invention, ammonium tungstate is prepared by treating a reduced calcium tungstate, in the presence of an oxidizing agent, with a solution containing particular cations and anions. The solution is capable of both leaching tungsten into the solution and preventing precipitation of calcium tungstate. Techniques for the preparation of the reduced calcium tungstate are described hereinafter.

The cations in the aqueous solution treating the reduced calcium tungstate include at least ammonium ions. The ammonium ions react with the reduced calcium tungstate to form ammonium tungstate which is soluble in the solution. The ammonium ions can be supplied from a soluble ammonium salt (e.g., ammonium hydroxide) in the aqueous solution or can be formed at least in part by passing ammonia gas through the solution.

The anions in the solution include at least carbonate and/or bicarbonate ions. These particular ions react with the reduced calcium tungstate to form a calcium compound which is insoluble in the solution. The anions are preferably added as soluble salts of the cations (e.g., ammonium carbonate, ammonium bicarbonate), but can also be formed by passing carbon dioxide gas through the solution. This avoids the undesired precipitation of calcium tungstate. If calcium tungstate precipitation were to occur, a significant fraction of the tungsten would not be leached into solution, thereby resulting in a loss of tungsten and/or a necessity for additional process steps to recover tungsten from the insoluble calcium tungstate. The principles of preferential precipitation of the insoluble calcium compound will be understood by those skilled in the art.

The aqueous treatment of the reduced calcium tungstate is carried out in the presence of an oxidizing agent, preferably an excess of oxidizing agent. Some examples of suitable oxidizing agents are oxygen, hydrogen peroxide and peroxides of the alkali metals, and mixtures thereof. The peroxides are preferably added to the solution in a continuous or semi-continuous manner. Oxygen can be passed through the solution in the form of air. Oxygen and/or hydrogen peroxide are preferred oxidizing agents in the process.

As noted above, it is preferred to supply the ammonium cations and required anions from a soluble salt containing both types of ions. An aqueous solution of ammonium carbonate is therefore a preferred aqueous solution. In this solution, the ammonium carbonate is usually used in amounts approaching its solubility limit in the aqueous solution at the temperature of the solution. Less concentrated solutions, however, can also be used. Typical solutions will contain about 20 to 30 percent by weight of ammonium carbonate, based on the weight of the water solvent, and have a pH in the range 8–11, especially when in the presence of a stoichiometric excess of ammonia.

It is preferable to agitate the solution to improve the contact of the leaching solution with the reduced calcium tungstate. Depending on the material being leached, typical leaching times may vary from about 30 minutes to about 20 hours. The temperature at which the leaching step is generally carried out is in the range from 10° C to the boiling point of the solution, and preferably in the range 30°–70° C. Although feasible, leaching at lower temperatures may be uneconomically slow. At higher temperatures, difficulties may be experienced in maintaining the desired concentration of ammonia in solution.

The ammonium tungstate formed by the aqueous treatment is soluble in the solution under the treatment conditions used. Thus, the ammonium tungstate can be readily separated from the insoluble matter in the leaching system by well known techniques, such as filtration and/or centrifugation. The thereby separated solution of ammonium tungstate can then be evaporated to obtain the ammonium tungstate salt in solid form. The solid ammonium tungstate can then be recrystallized, if necessary, to reduce impurities to a desired level. Subsequently, the ammonium tungstate can be heated to form tungsten trioxide, which in turn can be reduced to metallic tungsten. Such techniques for forming tungsten trioxide and tungsten are known and are described in more detail in the aforementioned Li and Wang reference.

Optimum conditions for achieving maximum leaching rates with high levels of recovery of tungsten, depend on a number of variables, such as particle size of the tricalcium tungstate, temperature, rate of agitation and concentration of the solutions, as is understood by those skilled in the art.

Some impurities in the reduced calcium tungstate can have a detrimental effect on the leaching step, but these usually can be avoided by conventional techniques. Generally, the type of impurities depends on the source of the calcium tungstate, as for example, whether the reduced calcium tungstate was formed from scheelite or wolframite ores or concentrates and on the technique used to obtain reduced calcium tungstate therefrom. For example, if the ore or concentrate contains significant amounts of copper compounds, leaching the reduced calcium tungstate with ammonia solutions can result in the formation of undesirable copper-ammonia complexes which are soluble in the solution. Techniques for the separation of soluble copper-ammonia complexes from ammonia solutions are known. Also, if the ore or concentrate contains molybdenum in the form of a molybdate, such as calcium molybdate and/or the mineral powellite, or molybdenum sulfides, such as molybdenite, the molybdenum in the reduced calcium tungstate product formed from the ore or concentrate may be in a form that is leachable as soluble ammonium molybdate. However, if a concentrate is used in the manufacture of calcium tungstate, the amounts of the copper or molybdenum compounds can be reduced to a level at which the formation of soluble ammonium molybdate and/or soluble copper-ammonia complexes during leaching is not a major problem.

Some impurities which may be present in the ores or concentrates can result in other process problems. For example, arsenic and/or sulphur compounds can be volatilized in the reduction step. Such volatile compounds can be corrosive to the materials from which the reduction apparatus is constructed. Under such circumstances, it is desirable to treat the ore or concentrate for removal of such impurities prior to reduction of the ores or concentrates.

The process of the present invention may be operated as a batch or as a continuous process, or a mixture thereof, as each step of preferred embodiments of the process described herein may be operated in a batch or continuous manner. The process is usually operated throughout at atmospheric pressure, although superatmospheric pressures may be used, if desired.

The reduced calcium tungstate can be obtained by the reduction of calcium tungstate, scheelite ores or concentrates, or mixtures capable of forming calcium tungstate. Calcium tungstate is reduced by contacting the tungstate with a reducing agent at elevated temperatures. The reduction conditions depend in part on temperature, the particular reducing agent used, the particle size of the tungstate and the gas velocity, if the reducing agent is a gas. Hydrogen is a preferred reducing agent. Calcium tungstate can be reduced by heating in the presence of hydrogen at temperatures in the range 800° to 1300° C, preferably in the range 1050° to 1250° C. At lower temperatures, the rate of reduction can be uneconomically slow. At higher temperatures, sintering or fusion of the tungstate can occur which can affect the leachability of the reduced tungstate. In the reduction step, hydrogen can be continuously passed over or through the tungstate and then recycled through a purification step and over or through the tungstate again, additional hydrogen being added as required. The reduction of calcium tungstate with hydrogen is described in U.S. Pat. No. 2,992,916 of A. E. Newkirk which issued July 18, 1961.

The reduction of calcium tungstate can also be accomplished with ammonia or mixtures of ammonia and hydrogen under conditions similar to those described for reduction with hydrogen. However, at the reduction temperatures, the ammonia can dissociate and cause formation of tungsten nitrides, which can present a problem in subsequent processing steps. Carbon and/or a carbon-containing reducing agent, such as carbon monoxide, mixtures of carbon monoxide and hydrogen, gaseous hydrocarbons, synthesis gas, water gas, semi-water gas, coal gas and the like, can also be used to reduce the calcium tungstate under similar conditions to those described for the reduction with hydrogen. However, tungsten carbides can sometimes form and could cause subsequent processing problems. Hence, reduction of calcium tungstate with hydrogen is preferred.

The reduced calcium tungstate can also be obtained by the reduction of a tungstate that forms calcium tungstate in situ. For example, wolframite ores or mixtures of wolframite ores and scheelite can be reduced in the presence of a calcium donor compound. Suitable calcium donor compounds are, for example, calcium oxide, hydroxide, nitrate or carbonate, limestone and dolomite, and mixtures thereof. Such calcium donor compounds can be present in the ore or concentrate or can be added thereto. Generally, magnesium salts are not introduced into the tungstate ore or concentrate because in the reduction step, tri(magnesium/calcium) tungstates can form and such tungstates are not readily leachable in the process of the present invention. However, if magnesium is introduced, for example as dolomite, an excess of calcium is used so that tricalcium tungstate and not tri(magnesium/calcium) tungstate is formed. It is believed that tricalcium tungstate is formed preferentially in the presence of an excess of calcium.

The reduction of calcium tungstate can be facilitated by the presence of, for example, silica, alumina and metallic iron, especially silica, in the tungsten ore or concentrate. These compounds can be present in the ore or concentrate or can be added thereto.

Other techniques for the reduction of tungstates are known and are described in more detail in the aforementioned Li and Wang reference.

The products of the reduction of calcium tungstate include tricalcium tungstate and finely divided metallic tungsten, the ratio of tricalcium tungstate to metallic tungsten depending on the extent of reduction. Both the tricalcium tungstate and finely divided metallic tungsten are leachable in the leaching process described hereinabove. In the presence of iron, the intermetallic species $Fe_7W_6$ also can be formed. This species, which is also leachable in the process of the present invention, is discussed in more detail in the copending application of H. P. Kasserra having the same convention priority date as the present application.

Tricalcium tungstate decomposes in water giving calcium tungstate. Tricalcium tungstate can also decompose slowly in moist air, but it is believed to be stable in dry air. It is, therefore, desirable to treat the reduced tungstate according to the invention shortly after reduction and/or to protect the reduced tungstate from the effects of water until the aqueous leaching is commenced.

The properties of tricalcium tungstate, metallic tungsten and the intermetallic species, the leaching thereof and the conversion of the leached tungsten to, in particular, tungsten trioxide are discussed and exemplified in the aforementioned copending application of H. P. Kasserra and in the copending application of H. P. Kasserra, D. B. Kelly and I. Obadia, having the same convention priority date as the present application.

The process of the present invention provides a method, which employs relatively inexpensive materials and permits manufacture of tungsten or tungsten compounds at potentially economical rates and levels of tungsten recovery. The process is substantially pollution-free; contaminants in effluent streams from the process may be treated by known techniques, if necessary, to remove any pollutants. As the process is operated under relatively mild conditions, the tungsten compounds obtainable are less susceptible to contamination by impurities. Furthermore, if ammonia and/or carbon dioxide are used in the leaching step, these materials can be recovered subsequently and recycled.

The present invention is illustrated by the following examples.

EXAMPLE I

A 131.3—g sample of a scheelite concentrate of −35 TYLER mesh and containing 75.9% by weight of tungsten trioxide was reduced with hydrogen at 1100° C for 6 hours. A flow of 5 liters/min. of hydrogen over the sample was maintained during the reduction process. The product was cooled in an atmosphere of nitrogen and the measured weight loss (13.8 g) was two-thirds of the theoretical weight loss for complete reduction of calcium tungstate to tungsten metal. X-ray diffraction spectroscopy indicated the reduced product was tricalcium tungstate and tungsten metal with only a trace of calcium tungstate being present. A 25.1—g sample of the above-prepared reduced scheelite, which was shown by X-ray fluorescence analysis to contain 70.4% by weight of tungsten, was added to a solution of 342—g of ammonium carbonate in one liter of approximately 12% aqueous ammonia at 50° C. About 150 g of coarse silica sand were added, as a grinding medium, and the resultant mixture was stirred at 600 rpm. Ammonia gas and oxygen were each bubbled through the solution at a rate of 100 $cm^3$/min. After 48 hours the solution was filtered and the residue was washed. The resultant filtrate was shown by atomic absorption analysis to contain 96.7% of the theoretical amount of tungsten in the reduced scheelite.

EXAMPLE II

A sample of scheelite concentrates was reduced by the procedure of Example I. A 3.40—g sample of the reduced scheelite, containing 70.4% by weight of tungsten, was added to a solution of 50 g of ammonium bicarbonate in 200 ml of approximately 12% aqueous ammonia at 50° C. The resultant slurry was agitated for 5 hours with ammonia gas and oxygen each being bubbled through the slurry at a rate of 100 $cm^3$/minute. The resultant solution was then filtered and the residue washed. Analysis of the filtrate by atomic absorption showed that 47.2% of the tungsten in the reduced scheelite had been leached. Analysis of the residue by X-ray diffraction showed the presence of a major amount of unleached tungsten metal. An extended leach of the residue using the above procedure resulted in almost complete leaching of the tungsten from the residue.

EXAMPLE III

A sample of commercial scheelite concentrate of −250 TYLER mesh and containing 76.9% by weight of tungsten trioxide was reduced with hydrogen by the procedure of Example I, except that the temperature ranged from 1200°–1300° C. Analysis indicated that about 80% of the tungsten in the scheelite concentrate was reduced to metallic tungsten, the remainder being in the form of tricalcium tungstate. A 20.06 —g sample of the reduced scheelite was added to 400 ml of an ammonium carbonate solution initially containing about 175 g/l of ammonia and 90 g/l of carbon dioxide. Ammonia gas was bubbled through the solution at a rate of 50 cm³/min. While the solution was being agitated 100 ml of a 30% hydrogen peroxide solution was added over a period of two hours. The temperature of the solution varied in the range 50°-80° C. The solution was then filtered and the solid residue was washed with dilute ammonium carbonate solution. Analysis of the residue by X-ray fluorescence showed that 92.5% of the tungsten in the reduced sheelite had been leached. A portion of the filtrate was evaporated to dryness and the resultant solids were heated at 800° C for 30 minutes. X-ray diffraction analysis of the heated solids showed only one phase, tungsten trioxide. Calculations showed that if the heated solids were pure tungsten trioxide, 93.9% of the tungsten of the reduced scheelite was leached into solution. This confirmed within experimental error, the result obtained by X-ray fluorescence analysis of the leach residue.

EXAMPLE IV

In this example samples of reduced calcium tungstate are produced by various methods. The samples so produced were generally suited for leaching according to the invention. Parts (a) and (b) show the desireability of including silica with the material being reduced. Part (c) shows the effect of alumina on the reduction step. Part (d) shows scheelite and wolframite being treated simultaneously in the reduction step. For parts (a) through (d), the reduction was carried out in hydrogen, whereas the reducing agent in part (e) was ammonia and in part (f) was carbon powder.

Part (a)

A 32.49—g sample of the scheelite concentrate of Example I and 17.43—g sample of a 1:1 mixture by weight of the scheelite concentrate and finely ground silica sand were separately but simultaneously reduced in a horizontal tube furnace at 1200° C under a flow of 0.95 liters/min. of hydrogen for 4 hours and 15 minutes. The products were cooled under nitrogen. The weight loss for the scheelite concentrate was 3.59 g (70% of theoretical) while the weight loss for the scheelite/sand mixture was 1.27 g (93% of theoretical). X-ray diffraction analysis indicated the reduced scheelite contained more tricalcium tungstate than the reduced scheelite/silica sand mixture; calcium tungstate was not detected in either product.

Part (b)

Weighed samples (2.5-5.0 g) of a scheelite concentrate or scheelite concentrate/silica mixtures were reduced at 1050° C in a vertical combustion tube which formed part of a thermal gravimetric analysis apparatus. The flow of hydrogen over the samples was 3 liters/minute. Sample 1 was scheelite concentrate containing 60.2% by weight tungsten. Samples 2 and 3 were scheelite concentrate/silica mixtures containing 42.5% and b 30.1% by weight tungsten, respectively. The reduction proceeded as follows:

| Sample No. | 1 | 2 | 3 |
| --- | --- | --- | --- |
| % Reduction | | | |
| After 1½ hours | 76 | 90 | 100 |
| After 2½ hours | 86 | 97 | — |
| Approximate hours | | | |
| for 100% Reduction | 5.3 | 3 | 1.5 |

Part (c)

A 1:1 mixture by weight of the scheelite concentrate of Example 1 and colloidal alumina was prepared. A 14.3—g sample of this mixture was reduced in a horizontal tube furnace at 1200° C under a flow of 950 cm³/minute of hydrogen for 2 hours and 40 minutes. The product was cooled in an atmosphere of nitrogen. X-ray diffraction analysis showed that the product contained less tricalcium tungstate than the reduced scheelite of Part (a) where the reduction was carried out for a longer period of time. No calcium tungstate was detected in the reduced scheelite/alumina product.

Part (d)

A mixture of 10.0 g of a commercial scheelite concentrate containing 75.9% by weight of tungsten trioxide and 10.5 g of a commercial wolframite concentrate containing 71.9% by weight of tungsten trioxide was ground to −325 TYLER mesh and then pelletized. A 3.31—g sample of the pellets was reduced at 1200° C in a horizontal tube furnace with a flow of dry hydrogen of 200 cm³/minute. After 4.8 hours the weight loss of the pellets indicated a 92% reduction of the tungstates to tungsten metal. X-ray diffraction analysis of the reduced pellets showed the presence of metallic tungsten, an intermetallic iron/tungsten species of composition $Fe_7W_6$ and a small amount of tricalcium tungstate. The presence of the latter could account for the incomplete reduction as determined by weight loss. Residual scheelite was not detected in the reduced pellets.

Part (e)

A 4.84—g sample of a commercial scheelite concentrate containing 75.9% by weight of tungsten trioxide was ground to −325 TYLER mesh, pelletized and reduced by the procedure of Part (b), except that instead of hydrogen, dry ammonia gas was passed over the pellets at 1720 cm³/minute. After 3 hours and 25 minutes the weight loss of the pellets indicated that 74% of the tungstate had been reduced to metallic tungsten. X-ray diffraction analysis of the reduced pellets showed the presence of metallic tungsten and tricalcium tungstate. Scheelite was not detected.

Part (f)

A mixture of four parts of commercial scheelite concentrate containing 75.9% by weight of tungsten trioxide and one part of carbon powder was pelletized. A 3.50 g sample of the pellets was reduced by the procedure of Part (b) except that nitrogen was passed over the pellets at 100 cm³/minute and the temperature of the furnace was gradually raised to almost 1200° C. When the thermal gravimetric analysis apparatus indicated no further weight loss, the reduced pellets were cooled in an atmosphere of nitrogen. X-ray diffraction analysis of the reduced pellets showed that reduction to metallic tungsten was incomplete and that some tungsten carbides had been formed.

I claim:

1. A process for preparing ammonium tungstate comprising heating a material containing calcium tungstate in the presence of a reducing agent at a temperature in the range of 800° to 1300° C to form a reduced calcium tungstate material comprising tricalcium tungstate or metallic tungsten or mixtures thereof, treating the thusly formed reduced calcium tungstate material with an aqueous solution having at least ammonium cations and anions selected from the groups consisting of carbonate ions, bicarbonate ions and mixtures thereof, at a temperature in the range of 30° to 70° C in the presence of an excess of an oxidizing agent, the quantity of ammonium cations being sufficient to react with a substantial fraction of the tungsten values in the reduced calcium tungstate material to form the ammonium tungstate which is soluble in the solution and the quantity of anions being sufficient to react with a substantial fraction of the calcium in the reduced calcium tungstate material to form a calcium compound which is insoluble in the solution, and thereafter separating the insoluble matter from the ammonium tungstate solution.

2. The process of claim 1 wherein the oxidizing agent is selected from the group consisting of oxygen, hydrogen peroxide and mixtures thereof.

3. The process of claim 2 wherein gaseous ammonia is bubbled through the aqueous solution.

4. The process of claim 3 wherein gaseous carbon dioxide is bubbled through the aqueous solution.

5. The process of claim 1 wherein the ammonium cations and the anions are provided by ammonium carbonate which is present in the aqueous solution in a concentration of 20 to 30%.

6. The process of claim 1 wherein the material containing calcium tungstate comprises an ore or concentrate of scheelite.

7. The process of claim 1 wherein the reducing agent is hydrogen.

8. The process of claim 6 wherein the temperature of heating is in the range of 1050° to 1250° C.

* * * * *